United States Patent Office 3,729,508
Patented Apr. 24, 1973

3,729,508
SULFONYLBENZOIC ACIDS
Carl Ziegler, Glenside, and James M. Sprague, Gwynedd Valley, Pa., assignors to Merck & Co., Inc., Rahway, N.J.
No Drawing. Filed Nov. 20, 1969, Ser. No. 878,576
Int. Cl. C07c 147/06
U.S. Cl. 260—515 A          7 Claims

ABSTRACT OF THE DISCLOSURE

Sulfonylbenzoic acids and salts, esters and amides thereof wherein the benzene ring may be either unsubstituted or substituted by one or more lower alkyl, halo, trihalomethyl, nitro, hydroxyamino, carboxy, amino, halosulfonyl or sulfamoyl radicals. The products are prepared by treating a suitable thiobenzoic acid or sulfinylbenzoic acid with an oxidizing agent and are useful as uricosuric agents in the treatment of gout and gouty arthritis.

---

This invention relates to a new class of chemical compounds which can be described generally as sulfonylbenzoic acids and the non-toxic, pharmaceutically acceptable salts, esters and amides thereof. It is also an object of this invention to describe a method for the preparation of the sulfonylbenzoic acids.

Pharmacological studies indicate that the instant products are effective uricosuric agents, i.e., they promote the excretion of uric acid by the kidney, and are thus useful in the treatment of gout and gouty arthritis. The instant products are also a valuable adjuvant for inhibiting excretion of penicillin, thus maintaining high antibiotic levels in the treatment of conditions that require intensive penicillin therapy.

The sulfonylbenzoic acids of this invention are compounds having the following structural formula:

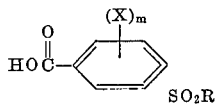

wherein R is alkyl containing at least 5 carbon atoms, for example, straight or branched chain alkyl containing from 5 to 10 carbon atoms such as n-pentyl, 3-pentyl, 3-methyl-3-pentyl, 2-hexyl, 4-heptyl, 1-heptyl, 3-heptyl, 1,6-dimethyloctyl and the like, cycloalkyl, for example, mononuclear and polynuclear lower cycloalkyl containing from 5 to 7 nuclear carbon atoms such as cyclopentyl, cyclohexyl, norbornyl and the like, alkyl substituted cycloalkyl, for example, alkyl substituted mononuclear cycloalkyl containing 5–6 nuclear carbon atoms such as 1-ethylcyclohexyl and the like, cycloalkylalkyl, for example, mononuclear cycloalkyl substituted lower alkyl such as cyclohexylmethyl, 1-cyclohexylethyl, 2-cyclohexylethyl and the like, alkenyl, for example, lower alkenyl such as allyl, 2-butenyl, 1-methyl-2-butenyl and the like, alkynyl, for example, lower alkynyl such as 2-propynyl, 3-butynyl and the like, haloalkyl such as 4-chlorobutyl and the like, polyhalo substituted alkyl, for example, dihalo and trihalo-lower alkyl such as 4,4'-dichlorobutyl and the like or 4,4,4-trichlorobutyl and the like, or a 5- or 6-membered heterocycle containing a single hetero atom selected from oxygen or nitrogen such as 2-furyl, 2-pyrrolidinyl, 2-pyridyl, 2-piperidyl and the like; X is hydrogen, halo such as bromo, chloro, fluoro and the like, lower alkyl, such as methyl and the like, trihalomethyl such as trifluoromethyl and the like, nitro, hydroxyamino, carboxy, amino, halosulfonyl such as chlorosulfonyl and the like or sulfamoyl and m is an integer having a value of 1–4.

A preferred embodiment of this invention relates to 3- and 4-sulfonylbenzoic acids of the following formulae:

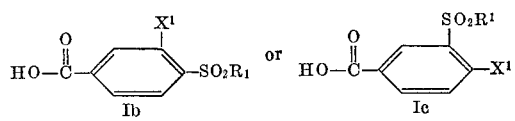

wherein $R^1$ is a straight or branched chain alkyl containing from 6 to 7 carbon atoms and $X^1$ is hydrogen, halo or trihalomethyl. This class of compounds exhibits particularly good uricosuric activity and represents a preferred subgroup of compounds within the scope of this invention.

Those products corresponding to Formula I, supra, wherein X is hydrogen, lower alkyl, halo, trihalomethyl, nitro or carboxy are obtained by treating the corresponding sulfinylbenzoic acid precursor (III, infra) with an oxidizing agent. The following equation illustrates this method of preparation:

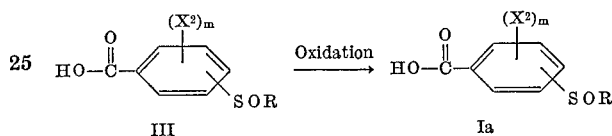

wherein R and m are as defined above and $X^2$ is hydrogen, lower alkyl, halo, trihalomethyl, nitro or carboxy. Alternatively, in lieu of the sulfinylbenzoic acid precursor (III) it is also possible to employ as a reactant in this process the corresponding thiobenzoic acid (II, infra). According to this method of preparation, the thiobenzoic acid reactant (II) is first oxidized to the corresponding sulfinylbenzoic acid derivative (III) and then to the desired sulfonylbenzoic acid (Ia). In practice, when it is desired to isolate the sulfinylbenzoic acid derivative (III) it is only necessary to treat the thiobenzoic acid (II) with a stoichiometric amount of oxidizing agent. The sulfinylbenzoic acid thus obtained may then be removed by filtration and, if desired, may be purified by recrystallization from a suitable solvent such as ethanol. The following equation illustrates the two-step conversion of the thiobenzoic acid reactant (II) to the sulfinylbenzoic acid intermediate (III) and then to the desired sulfonylbenzoic acid product (Ia):

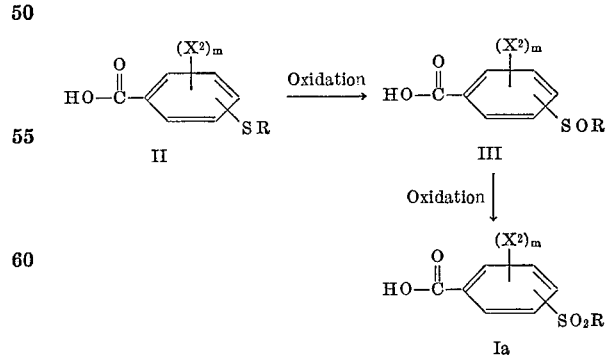

wherein R, $X^2$ and m are as defined above. Oxidizing agents which are suitable for use in both oxidation steps include, for example, hydrogen peroxide, chromium trioxide, potassium permanganate and the like. The oxidation reaction may be conducted in any solvent in which the reactants are reasonably soluble and substantially inert. Suitable solvents include acetic acid, acetone and the like. Temperature is not particularly critical to the success of the reaction and, in general, temperatures in the range from about 0° to about 100° C. are suitable; however, it is usually convenient to conduct the reaction at temperatures in the range from about 0° to room temperature and preferably in an ice bath at about 0° C.

When the product obtained according to the foregoing method is a (sulfonyl)nitrobenzoic acid (Id, infra) said derivative may be converted to the corresponding nuclear hydroxyamino, amino, halosulfonyl or sulfamoyl substituted sulfonylbenzoic acid by one of the following methods:

The nuclear hydroxyamino substituted sulfonylbenzoic acids are prepared by the partial reduction of the sulfonylnitrobenzoic (Id, infra) acid as, for example, by catalytic hydrogenation in the presence of a suitable catalyst such as platinum, palladium and the like. It is most desirable to conduct this reaction at ambient temperature in a suitable solvent such as the alkanol solvents, especially the lower alkanols such as methanol, ethanol and the like. The following equation illustrates the process wherein there is one nitro substituent; however, it should be understood that those sulfonylbenzoic acids having more than one nitro substituent may be substituted therefor to afford a similar product:

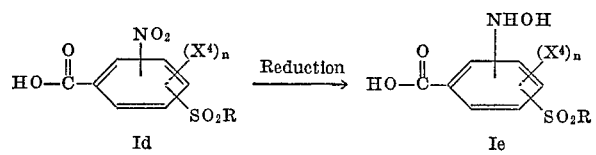

wherein R is as defined above, $X^4$ is hydrogen, lower alkyl, halo, trihalomethyl or carboxy and $n$ is an integer having a value of 1–3.

The nuclear amino substituted sulfonylbenzoic acids are conveniently prepared by treating the corresponding (sulfonyl)nitrobenzoic acid (Id, infra) either chemically with iron powder and the like or by catalytic hydrogenation with a catalyst such as Raney nickel catalyst in the presence of sodium hydroxide. Although the temperature at which the reaction is conducted is not critical, we have found it convenient to conduct the reaction at ambient temperatures. The following equation illustrates the process wherein there is one nitro substituent; however, it should be understood that those sulfonylbenzoic acids having more than one nitro substituent may be substituted therefor to afford a similar product:

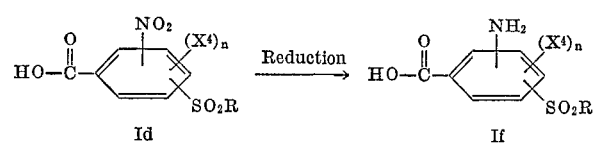

wherein R, $X^4$ and $n$ are as defined above.

The nuclear amino substituted sulfonylbenzoic acids (If) obtained according to the foregoing procedure may be converted to the corresponding nuclear halosulfonyl substituted sulfonylbenzoic acids (Ig, infra) by diazotization. The said (sulfonyl)aminobenzoic acid (Ie) is dissolved in a solution of glacial acetic acid and concentrated hydrochloric acid and converted to its corresponding diazonium salt by treatment with an aqueous solution of sodium nitrite. The diazonium salt of the (sulfonyl) benzoic acid (Ig, infra) is then treated with a glacial acetic acid solution of sulfur dioxide, a cuprous halide such as cuprous chloride, cuprous fluoride and the like and water. Due to the nature of the diazonium salts, the reaction is generally conducted in a temperature range of from about 0° C. to 25° C. The following equation illustrates this process:

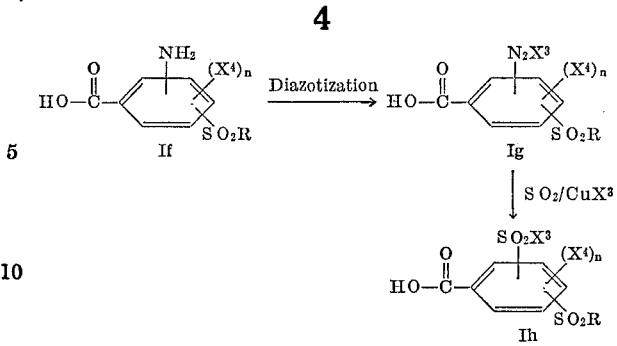

wherein R, $X^4$ and $n$ are as defined above and $X^3$ is halo such as bromo, chloro, fluoro and the like.

The (sulfonyl)halosulfonylbenzoic acids (Ih, infra) may be converted to their corresponding nuclear sulfamoyl substituted sulfonylbenzoic acids (Ii, infra) by treatment with ammonia, preferably liquid ammonia. The following equation illustrates this process:

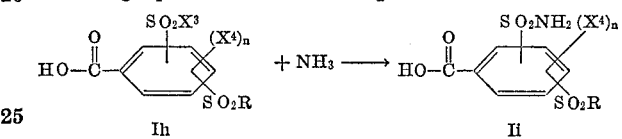

wherein R, $X^4$, $n$ and $X^3$ are as defined above.

The thiobenzoic acids (IIa, infra) are conveniently prepared by either of two alternative methods. One such method comprises treating the alkali metal salt of a suitable mercaptobenzoic acid (IV, infra) with a compound of the formula: $X^3R$ wherein R and $X^3$ are as defined above. Any solvent in which the reactants are soluble and which are inert to the reactants employed may be used. Typical of such solvents are ethanol, benzene, toluene and the like. While the temperature at which the reaction is conducted is not a particularly critical aspect of this invention, we have found it convenient to conduct the reaction at temperatures ranging from ambient temperature up to the reflux temperature of the solvent employed. The following equation illustrates this process:

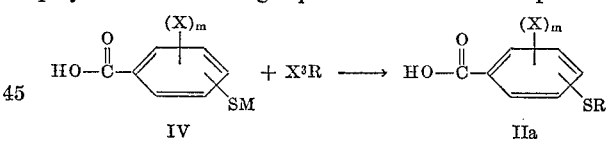

wherein R, X, $X^3$ and $m$ are as defined above and M is a cation derived from an alkali metal such as sodium and the like.

A second method of preparation and one which is limited to the synthesis of p-thiobenzoic acids (IIb, infra) wherein the benzene nucleus is substituted in the 3-position by a strong electron attracting group such as nitro, carboxy, sulfamoyl and the like, comprises treating a corresponding halobenzoic acid (V, infra) with a compound of the formula: MSR wherein R and M are as defined above. Solvents which may be employed are alkanols, for example, lower alkanols such as ethanol and the like. Also, it is convenient to add the alkali metal salt of the mercaptan reactant at a temperature of about 0° C. followed by an increase of temperature up to the reflux temperature of the solvent system once the addition is complete. The following equation illustrates this process:

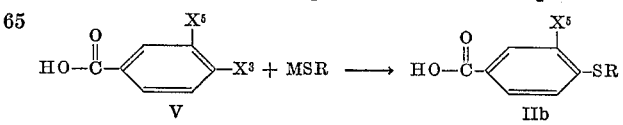

wherein R, M, $X^3$ and $m$ are as defined above and $X^5$ is a strong electron attracting group such as nitro, carboxy, sulfamoyl and the like.

The alkali metal salts of the mercaptobenzoic acid reactants (IV, supra) are prepared by treating the corresponding mercaptobenzoic acid (VI, infra) with a suitable base as, for example, with an alkali metal alkoxide or an alkali metal hydride such as sodium ethoxide or sodium hydride and the like. When an alkoxide is employed, it is most convenient to employ, as the solvent, an alkanol which corresponds to the alkoxide portion of the alkali metal alkoxide, whereas, when an alkali metal hydride is employed it is most advantageous to use hydrocarbon solvents such as benzene, toluene and the like. This reaction is conveniently conducted at the reflux temperature of the solvent system employed. The following equation illustrates this process:

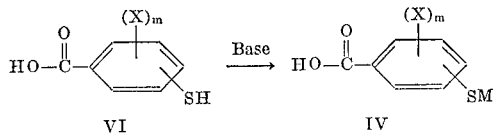

wherein M, X and $m$ are as defined above.

The mercaptobenzoic acids (VI, supra) employed in the preparation of the alkali metal salts of the mercaptobenzoic acids (IV, supra) are either known compounds or are prepared by treating a suitable halosulfonylbenzoic acid (VII, infra) with a reducing agent such as zinc amalgam, zinc dust or stannous chloride. The reaction is preferably conducted in an aqueous solution of a mineral acid such as hydrochloric acid, sulfuric acid and the like or a lower alkanoic acid such as acetic acid and the like. The following equation illustrates this process:

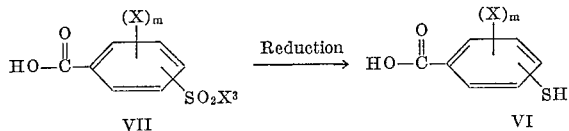

wherein X, $X^3$ and $m$ are as defined above.

The halosulfonylbenzoic acids (VI, supra) are either known compounds or may be prepared by treating the corresponding benzoic acid (VIII, infra) with a halosulfonic acid such as chlorosulfonic acid, fluorosulfonic acid and the like. This reaction is conducted by adding the benzoic acid (VIII) to the halosulfonic acid at room temperature and, when the addition is complete, warming the reaction mixture to facilitate completion of the reaction. The following equation illustrates this process.

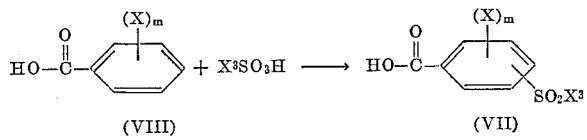

wherein X, $X^3$ and $m$ are as defined above.

Included within the scope of this invention are the non-toxic, pharmaceutically acceptable salts of the instant products. In general, any base which will form a salt with the foregoing sulfonylbenzoic acids and whose pharmacological properties will not cause an adverse physiological effect when ingested by the body system is considered as being within the scope of this invention. Suitable bases include, for example, those derived from the alkali metals and alkaline earth metals as, for example, the alkali metal and alkaline earth metal carbonates and hydroxides such as sodium carbonate, magnesium carbonate, sodium hydroxide, calcium hydroxide, potassium hydroxide and the like. Also, included are salts of ammonia and primary and secondary amines as, for example, alkylamines, dialkylamines and heterocyclic amines such as methylamine, ethylamine, dimethylamine, diethylamine, piperidine and the like.

Also included within the scope of this invention are the ester and amide derivatives of the instant products. The ester and amide derivatives may be prepared by the reaction of a sulfonylbenzoic acid of this invention with an alcohol as, for example, with a lower alkanol such as methanol, ethanol and the like, lower alkanamido lower alkanols such as 2-acetamidoethanol and the like, benz- amido lower alkanols such as benzamidoethanol and the like or with ammonia or an amine, for example, mono- or dialkylamine, such as methylamine, dimethylamine, diethylamine and the like or, alternatively, the sulfonylbenzoic acid may be converted to its acid halide by conventional methods and the acid halide treated with an appropriate alcohol or amine.

The foregoing and other equivalent methods for the preparation of the salts, esters and amide derivatives of the instant products (I) will be apparent to those having ordinary skill in the art and, to the extent that the said derivatives are both nontoxic and physiologically acceptable to the body system the said salts, esters and amides are the functional equivalent of the sulfonylbenzoic acid product (I).

The examples which follow illustrate the sulfonylbenzoic acids of this invention and the method by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

3-chloro-4-(4-heptylsulfonyl)benzoic acid

Step A: 3-chloro-4-chlorosulfonylbenzoic acid.—3-chlorobenzoic acid (156.0 g., 1.0 mole) is added to chlorosulfonic acid (330 ml.). After heating at 60°–65° C. for two hours, the solution is cooled and poured onto crushed ice to yield crude 3-chloro-4-chlorosulfonylbenzoic acid, M.P. 151°–153° C.

Step B: 3-chloro-4-mercaptobenzoic acid.—To a suspension of 3-chloro-4-chlorosulfonylbenzoic acid (12.8 g., 0.05 mole) in a solution of sulfuric acid (62 ml.) and water (125 ml.) is added zinc amalgam. [The zinc amalgam is prepared by dissolving mercuric chloride (7.5 g.) in a solution of water (125 ml.) and hydrochloric acid (5 ml.) followed by the addition of zinc dust (37.5 g.). The mixture is stirred for 15 minutes and then filtered. The zinc amalgam is washed successively with water, ethanol and finally diethyl ether.] After the addition of the zinc amalgam, the reaction mixture is warmed on a steam bath for 3 hours. The reaction mixture is cooled and extracted with three 300 ml. portions of ether. The ether extract is dried over sodium sulfate, filtered and the filtrate concentrated to about 50 ml. to obtain crude 3-chloro-4-mercaptobenzoic acid. The product is recrystallized from ether to obtain substantially pure 3-chloro-4-mercaptobenzoic acid, M.P. 240°–245° C.

Step C: 3-chloro-4-(4-heptylthio)benzoic acid.—A solution of sodium ethoxide in ethanol is prepared by adding 2.3 g. (0.1 g. atom) of sodium to 100 ml. of ethanol. To this solution is added 9.9 g. (0.052 mole) of 3-chloro-4-mercaptobenzoic acid. The resulting suspension is heated on the steam bath, under reflux, for ¼ hours. Heating is then discontinued while 18 g. (0.1 mole) of 4-bromoheptane is added slowly through a dropping funnel after which it is again heated under reflux for an additional 2 hours. After removal of about ½ the solvent, the residue is cooled and water is added. The excess bromide is removed by extraction with ether and the product is precipitated from the aqueous phase by acidification with dilute hydrochloric acid to afford 3-chloro-4-(4-heptylthio)benzoic acid, M.P. 93°–95° C.

Elemental analysis for $C_{14}H_{19}ClO_2S$.—Calc. (percent): C, 58.62; H, 6.68. Found (percent) C, 58.55; H, 6.62.

Step D: 3-chloro-4-(4-heptylsulfonyl)benzoic acid.—A suspension of 3-chloro - 4 - (4-heptylthio)benzoic acid (0.025 mole) in a mixture of 25 ml. of glacial acetic acid and 25 ml. of acetic anhydride is cooled to about 0° C. To this is added, dropwise, 9.1 g. (0.08 mole) of 30% hydrogen peroxide, over a period of ½ hour. The reaction is stirred while the ice bath melts and the reaction is allowed to come to room temperature. During this time the solution cleared. The reaction is allowed to stand overnight at room temperature. When the reaction is poured onto crushed ice, there is obtained 3-chloro-4-(4-heptylsulfonyl)benzoic acid, M.P. 81°–83° C.

Elemental analysis for $C_{14}H_{19}ClO_4S$.—Calc. (percent): C, 52.74; H, 6.01. Found (percent): C, 52.85; H, 5.93.

By substituting for the 3-chlorobenzoic acid of Example 1, Step A, an equimolar quantity of 2,3-dichlorobenzoic acid, 2,3,5-trichlorobenzoic acid and 2,3,5,6-tetrachlorobenzoic acid and by following substantially the procedure described therein, there is obtained, respectively, 2,3-dichloro-4-chlorosulfonylbenzoic acid, 2,3,5-trichloro-4-chlorosulfonylbenzoic acid, and 2,3,5,6-tetrachloro-4-chlorosulfonylbenzoic acid which, when substituted for the 3-chloro-4-chlorosulfonylbenzoic acid of Example 1, Step B, and following the procedure described therein, there is obtained, respectively, 2,3-dichloro - 4 - mercaptobenzoic acid, 2,3,5-trichloro-4-mercaptobenzoic acid and 2,3,5,6-tetrachloro-4-mercaptobenzoic acid and by substituting for the 3-chloro-4-mercaptobenzoic acid of Example 1, Step C, an equimolar quantity of 2,3-dichloro-4-mercaptobenzoic acid or 2,3,5-trichloro-4-mercaptobenzoic acid or 2,3,5,6-tetrachloro-4-mercaptobenzoic acid and following substantially the procedure described therein, there is obtained, respectively, 2,3-dichloro-4-(4-heptylthio)benzoic acid, 2,3,5-trichloro-4-(4-heptylthio)benzoic acid and 2,3,5,6-tetrachloro-4-(4-heptylthio)benzoic acid which, when substituted for the 3-chloro-4-(4-heptylthio)benzoic acid of Example 1, Step D, and following substantially the procedure described therein, affords, respectively, 2,3-dichloro-4-(4-heptylsulfonyl)benzoic acid, 2,3,5-trichloro-4-(4-heptylsulfonyl)benzoic acid and 2,3,5,6-tetrachloro-4-(4-heptylsulfonyl)benzoic acid.

EXAMPLE 2

4-(4-heptylsulfonyl)benzoic acid

Step A: 4-(4-heptylthio)benzoic acid.—A solution of sodium ethoxide in ethanol is prepared by adding 2.3 g. (0.1 g. atom) of sodium to 100 ml. of ethanol. To this is added 8 g. (0.052 mole) of p-mercaptobenzoic acid. The resulting suspension is heated on the steam bath, under reflux, for ¼ hour. Heating is then discontinued while 18 g. (0.1 mole) of 4-bromoheptane is added slowly through a dropping funnel after which it is again heated under reflux for an additional 2 hours. After removal of about ½ the solvent, the residue is cooled and water is added. The excess bromide is removed by extraction with ether and the product is precipitated from the aqueous phase by acidification with dilute hydrochloric acid. There is obtained 12.2 g. of 4-(4-heptylthio)benzoic acid, M.P. 70°–75° C. It may be recrystallized from petroleum ether to obtain a product, M.P. 76°–78° C.

Elemental analysis for $C_{14}H_{20}O_2S$.—Calc. (percent): C, 66.63; H, 7.98. Found (percent) C, 66.54; H, 7.76.

Step B: 4-(4-heptylsulfonyl)benzoic acid.—A suspension of 6.25 g. (0.025 mole) of 4-(4-heptylthio)benzoic acid in a mixture of 25 ml. of glacial acetic acid and 25 ml. of acetic anhydride is cooled to about 0° C. To this is added, dropwise, 9.1 g. (0.08 mole) of 30% hydrogen peroxide, over a period of ½ hour. The reaction is stirred while the ice bath melts and the reaction mixture is allowed to come to room temperature. During this time the solution clears. The reaction is allowed to stand overnight at room temperature. When the reaction is poured onto crushed ice, there is obtained 7.2 g. of 4-(4-heptylsulfonyl)benzoic acid, M.P. 147°–149° C. It may be recrystallized from aqueous alcohol.

EXAMPLE 3

4-(4-heptylsulfonyl)benzoic acid

Step A: 4-(4-heptylsulfinyl)benzoic acid.—A suspension of 5 g. (0.02 mole) of 4-(4-heptylthio)benzoic acid, prepared as described in Example 2, Step A, in a mixture of 15 ml. of acetic acid and 15 ml. of acetic anhydride is chilled in an ice bath and stirred while an aqueous solution of 29.2% hydrogen peroxide (2.6 g., 0.02 mole) is added. A complete solution resulted in 3 hours. After standing 15 hours at room temperature a small amount of insoluble material is removed by filtration and the clear filtrate is poured onto crushed ice. The crude product is recrystallized from 30% aqueous alcohol to obtain 4.4 g. of 4-4(4-heptylsulfinyl)benzoic acid. M.P. 159°–160° C. with effervescence.

Elemental analysis for $C_{14}H_{20}O_3S$.—Calc. (percent): C, 62.65; H, 7.51. Found (percent): C, 63.23; H, 7.49.

Step B: 4-(4-heptylsulfonyl)benzoic acid.—A suspension of 4-(4-heptylsulfinyl)benzoic acid (4.4 g., 0.0155 mole) in a mixture of glacial acetic acid (15 ml.) and acetic anhydride (15 ml.) is cooled to 0° C. To this is added dropwise 30% hydrogen peroxide (0.024 mole) over a period of ½ hour. The reaction mixture is allowed to stand overnight. The reaction mixture is poured onto crushed ice and the precipitate collected to yield 4-(4-heptylsulfonyl)benzoic acid.

EXAMPLE 4

4-(4-heptylsulfonyl)-3-nitrobenzoic acid

Step A: 4-(4-heptylthio)-3-nitrobenzoic acid.—To a solution of sodium ethoxide in ethanol, prepared by adding 2.3 g. (0.1 g. atom) of sodium to 300 ml. of ethanol, is added 6.6 g. (0.05 mole) of 4-heptylmercaptan. The resulting solution of sodium 4-heptylmercaptide is then cooled in an ice bath while 10.1 g. (0.05 mole) of 3-nitro-4-chlorobenzoic acid is added. The reaction then is heated under reflux, with good stirring, for two hours. About one-half the solvent is removed, the reaction is cooled and 300 ml. of water is added. Acidification with dilute hydrochloric acid causes the product to precipitate. There is obtained 13.1 g. of 4-(4-heptylthio)-3-nitrobenzoic acid, M.P. 154°–156° C., which can be recrystallized from a mixture of ether and petroleum ether to yield a pure product, M.P. 155°–156° C.

Elemental analysis for $C_{14}H_{19}NO_4S$.—Calc. (percent): C, 56.55; H, 6.44; N, 4.71. Found (percent): C, 56.89; H. 6.34; N, 4.95.

Step B: 4-(4-heptylsulfonyl)-3-nitrobenzoic acid.—By substituting an equivalent quantity of 4-(4-heptylthio)-3-nitrobenzoic acid for the 4-(4-heptylthio)benzoic acid in Example 1, Step B, and following the procedure described therein, there is obtained 4-(4-heptylsulfonyl)-3-nitrobenzoic acid, M.P. 157°–158° C.

Elemental analysis for $C_{14}H_{19}NO_6S$.—Calc. (percent): C, 51.05; H, 5.81; N, 4.25. Found (percent): C, 51.24; H, 5.60; N, 4.27.

EXAMPLE 5

3-hydroxyamino-4-n-octylsulfonylbenzoic acid

Step A: 3-nitro-4-n-octylsulfonylbenzoic acid.—By substituting for the 4-heptylmercaptan of Example 4, Step A, an equimolar quantity of n-octylmercaptan and by following substantially the procedure described therein, there is obtained 3-nitro-4-n-octylsulfonylbenzoic acid.

Step B: 3 - hydroxyamino - 4 - n-octylsulfonylbenzoic acid.—3-nitro-4-n-octylsulfonylbenzoic acid is dissolved in ethanol (6.8 g. in 150 ml.). Half a gram of 5% platinum on carbon catalyst is added and the mixture is shaken in an atmosphere of hydrogen. When no more hydrogen is absorbed, the solution is filtered and the filtrate is diluted with water to precipitate the product. There is obtained 5.3 g. of 3-hydroxyamino-4-n-octylsulfonylbenzoic acid, M.P. 152°–155° C., resolidifying and remelting above 200° C.

Elemental analysis for $C_{15}H_{23}NO_5S$.—Calc. (percent): C, 54.69; H, 7.04; N, 4.25. Found (percent): C, 55.00; H, 7.09; N, 4.27.

EXAMPLE 6

4-(4-heptylsulfonyl)-3-sulfamoylbenzoic acid

Step A: 3-amino-4-(4-heptylsulfonyl)benzoic acid.—A solution of 22 g. of 4-(4-heptylsulfonyl)-3-nitrobenzoic acid in 100 ml. of ethanol and 100 ml. of 10% sodium hydroxide solution (deep red) is stirred while 20 g. of Raney alloy is added, in portions, as frothing would allow. When the reaction is complete, a pale yellow solution is obtained. The residual nickel is removed by filtration and the filtrate is acidified with dilute hydrochloric acid. There is thus obtained 16.8 g. of 3-amino-4-(4-heptylsulfonyl)-benzoic acid, M.P. 187°–189° C.

Elemental analysis for $C_{14}H_{21}NO_4S$.—Calc. (percent): C, 56.16; H, 7.07; N, 4.68. Found (percent): C, 56.13; H, 6.88; N, 4.56.

Step B: 4 - (4 - heptylsulfonyl) - 3 - sulfamoylbenzoic acid.—A suspension of 9 g. (0.03 mole) of 3-amino-4-(4-heptylsulfonyl)benzoic acid in 50 ml. of glacial acetic acid and 25 ml. of concentrated hydrochloric acid is cooled to 0° C. and a solution of sodium nitrate (2.1 g., 0.03 mole) in water (10.0 ml.) is added, slowly, dropwise, with good stirring, at such a rate that the temperature remains below 5° C. The suspension of the diazonium salt is added to a solution of 20 g. of sulfur dioxide (20.0 g.) in acetic acid (40.0 mol.) containing cuprous chloride (2.0 g.). After 2 hours, 500 ml. of water is added and the product is filtered. The residue is added to 50 ml. of liquid ammonia. When the excess ammonia had evaporated, the residue is suspended in water and acidified. The solid residue is recrystallized from 50% aqueous alcohol to afford 2.3 g. of 4-(4-heptylsulfonyl)-3-sulfamoylbenzoic acid, M.P. 171°–173° C.

Elemental analysis for $C_{14}H_{21}NO_6S_2$.—Calc. (percent): C, 46.26; H, 5.82; N, 3.85. Found (percent): C, 46.24; H, 5.72; N, 3.72.

EXAMPLE 7

4-chloro-3-(4-heptylsulfonyl)benzoic acid

Step A: 4-chloro-3-chlorosulfonylbenzoic acid.—4-chlorobenzoic acid (1.0 mole) is added to chlorosulfonic acid (330 ml.). After heating at 60°–65° C. for two hours, the solution is cooled and poured onto crushed ice to yield crude 4-chloro-3-chlorosulfonylbenzoic acid.

Step B. 4-chloro-3-mercaptobenzoic acid.—To a suspension of 4-chloro-3-chlorosulfonylbenzoic acid (25.5 g., 0.1 mole) in a solution of sulfuric acid (125 ml., concentrated) and water (125 ml.) is added zinc amalgam. [The zinc amalgam is prepared by dissolving mercuric chloride (15.0 g.) in a solution of water (250 ml.) and concentrated hydrochloric acid (10 ml.) followed by the addition of zinc dust (75.0 g.). The reaction mixture is stirred for 10 minutes and then filtered. The zinc amalgam is washed successively with water (2.0 liters), ethanol and, finally, diethyl ether.] After the addition of the zinc amalgam the reaction mixture is heated on a steam bath with stirring for 4 hours. The reaction mixture is cooled and extracted with four 500 ml. portions of diethyl ether. The ether extract is dried over sodium sulfate, filtered and the filtrate concentrated to about 100–150 ml. to afford 14.5 g. of 4-chloro-3-mercaptobenzoic acid, M.P. 218°–222° C.

Step C: 4-chloro-3-(4-heptylthio)benzoic acid.—A solution of sodium ethoxide in ethanol is prepared by adding sodium (1.84 g., 0.08 mole) to ethanol (75 ml.). To this solution is added 4-chloro-3-mercaptobenzoic acid (7.5 g., 0.04 mole). The reaction mixture is refluxed for ¼ hour. 4-bromoheptane (14.3 g., 0.08 mole) is added slowly to the reaction mixture. When the addition is complete, the reaction mixture is again heated under reflux for an additional 2 hours. The reaction mixture is concentrated under vacuum and water (150 ml.) is added. The reaction mixture is extracted with ether and the product is precipitated from the aqueous phase by acidification with dilute hydrochloric acid to afford 9.2 g. of crude product, M.P. 62°–64° C. Recrystallization from ether yields substantially pure 4-chloro-3-(4-heptylthio)benzoic acid, M.P. 64°–66° C.

Elemental analysis for $C_{14}H_{19}ClO_2S$.—Calc. (percent): C, 58.62; H, 6.68. Found (percent): C, 58.38; H, 6.95.

Step D: 4-chloro-3-(4-heptylsulfonyl)benzoic acid.—A solution of 4-chloro-3-heptylthiobenzoic acid (8.2 g., 0.0286 mole) in a mixture of glacial acetic acid (5.0 ml.) and acetic anhydride (5.0 ml.) is cooled to 0° C. Hydrogen peroxide (9.2 g., 0.09 mole) is added dropwise to the reaction mixture. The reaction mixture is stirred while the ice bath melts and the reaction mixture is then allowed to come to room temperature. The reaction mixture is diluted with water to afford an oily product which is extracted with ether and then extracted from the ether phase with an aqueous sodium bicarbonate solution. The bicarbonate solution containing the product is acidified with dilute hydrochloric acid and the product again extracted with ether. Removal of the ether again affords an oil which slowly crystallizes. Several recrystallizations from cyclohexane affords pure 4-chloro-3-(4-heptylsulfonyl)benzoic acid, M.P. 108°–110° C.

Elemental analysis for $C_{14}H_{19}ClO_4S$.—Calc. (percent): C, 52.74; H, 6.01. Found (percent): C, 52.63; H, 6.01.

EXAMPLE 8

2-(4-heptylsulfonyl)benzoic acid

Step A: 2-(4-heptylthio)benzoic acid.—A solution of sodium ethoxide in ethanol is prepared by adding sodium (1.15 g., 0.05 gram atom) to ethanol (50 ml.). To this solution is added thiosalicylic acid (4.0 g., 0.02 mole). 4-bromoheptane (7.2 g., 0.04 mole) is then added and the reaction mixture is refluxed for 2 hours. The reaction mixture is concentrated to about ½ of its original volume and poured into water. Acidification with dilute hydrochloric acid affords crude product which is extracted with ether. The ether extract is extracted with an aqueous solution of sodium bicarbonate and the aqueous bicarbonate extract is acidified with dilute hydrochloric acid. The oil which precipitates is extracted with ether and the ether extract dried over sodium sulfate. The ether solution is filtered and the ether removed. The remaining oil is vacuum distilled to yield substantially pure 2-(4-heptylthio)benzoic acid, B.P. 175°–178° C./0.7 mm.

Elemental analysis for $C_{14}H_{20}O_2S$.—Calc. (percent): C, 66.63; H, 7.98. Found (percent): C, 66.31; H, 8.01.

Step B: 2-(4-heptylsulfonyl)benzoic acid.—To a solution of 2-(4-heptylthio)benzoic acid in a mixture of glacial acetic acid (15.0 ml.) and acetic anhydride (15.0 ml.) at 0° C. is slowly added hydrogen peroxide (5.0 g., 0.08 mole). The reaction mixture is stirred at 0° C. for one hour and allowed to come to room temperature. The reaction mixture is poured into water and the crude product extracted with ether. The ether extract is dried over sodium sulfate, filtered and the ether removed by distillation to afford crude product which is purified by recrystallization from hexane to afford substantially pure 2-(4-heptylsulfonyl)benzoic acid, M.P. 77°–79° C.

Elemental analysis for $C_{14}H_{20}O_4S$.—Calc. (percent): C, 59.14; H, 7.09. Found (percent): C, 59.36; H, 7.10.

EXAMPLE 9

3-(4-heptylsulfonyl)benzoic acid

Step A: 3-mercaptobenzoic acid.—By substituting for the 4-chloro-3-chlorosulfonylbenzoic acid of Example 7, Step B, and equimolar quantity of 3-chlorosulfonylbenzoic acid and following substantially the procedure described therein, there is obtained 15.5 g. of 3-mercaptobenzoic acid, M.P. 140°–145° C.

Step B: 3-(4-heptylthio)benzoic acid.—By substituting for the thiosalicylic acid of Example 8, Step A, an equimolar quantity of 3-mercaptobenzoic acid and following substantially the procedure described therein, there is obtained substantially pure 3-(4-heptylthio)benzoic acid, B.P. 181°–184° C./1.0 mm.

Elemental analysis for $C_{14}H_{20}O_2S$.—Calc. (percent): C, 66.63; H, 7.98. Found (percent): C, 66.99; H, 8.09.

Step C: 3-(4-heptylsulfonyl)benzoic acid.—By substituting for the 2-(4-heptylthio)benzoic acid of Example 8, Step B, and equimolar quantity of 3-(4-heptylthio)benzoic acid and following substantially the procedure described therein, there is obtained 3-(4-heptylsulfonyl(benzoic acid, M.P. 80°–82° C.

Elemental analysis for $C_{14}H_{20}O_4S$.—Calc. (percent): C, 59.14; H, 7.09. Found (percent): C, 59.19; H, 7.10.

EXAMPLE 10

Ethyl 4-(4-heptylsulfonyl)benzoate

Step A: 4-(4-heptylsulfonyl)benzoyl chloride.—A mixture of 4-(4-heptylsulfonyl)benzoic acid (30.0 g.) and thionyl chloride (100 ml.) is refluxed for 3 hours. The excess thionyl chloride is removed under reduced pressure to afford 4-(4-heptylsulfonyl)benzoyl chloride.

Step B: Ethyl 4-(4-heptylsulfonyl)benzoate.—4-(4-heptylsulfonyl)benzoyl chloride (15.0 g.) is added to absolute ethanol at 0° C. The reaction mixture is allowed to come to room temperature and is stirred an additional 3 hours at room temperature. The solvent is removed at reduced pressure and the residue vacuum distilled to yield ethyl 4-(4-heptylsulfonyl)benzoate, B.P. 175°–180° C./0.5 mm.

Elemental analysis for $C_{16}H_{24}O_4S$.—Calc. (percent): C, 61.51; H, 7.74. Found (percent): C, 61.53; H, 7.53.

By substituting for the ethanol in Example 10, Step B, an equimolar quantity of methanol, 2-acetamidoethanol and benzamidoethanol and following substantially the procedure described therein, there is obtained, respectively, methyl 4-(4-heptylsulfonyl)benzoate, 2-acetamidoethyl 4-(4-heptylsulfonyl)benzoate and benzamidoethyl 4-(4-heptylsulfonyl)benzoate.

EXAMPLE 11

4-(4-heptylsulfonyl)benzamide

By substituting for the ethanol of Example 10, Step B, an equimolar quantity of ammonia and following substantially the procedure described therein, there is obtained 4-(4-heptylsulfonyl)benzamide.

By substituting for the ammonia of Example 11, an equimolar quantity of dimethylamine and diethylamine and following the procedure described therein, there is obtained, respectively, dimethyl 4-(4-heptylsulfonyl)benzamide and diethyl 4-(4-heptylsulfonyl)benzamide.

In a manner similar to that described in Example 1 for the preparation of 3-chloro-4(4-heptylsulfonyl)benzoic acid, all of the sulfonylbenzoic acids of this invention wherein X is selected from hydrogen, halo, trihalomethyl, nitro, or carboxy may be obtained. Thus, by substituting the appropriate substituted benzoic acid for the 3-chlorobenzoic acid of Example 1, Step A, and by following substantially the procedure described in Steps A through D of that example, all of the products of this invention may be obtained. The following equations depict the reactions of Example 1, Steps A through D and, together with Table I, illustrate the mercaptobenzoic acid starting materials, the corresponding intermediates and the sulfonylbenzoic acid products obtained thereby:

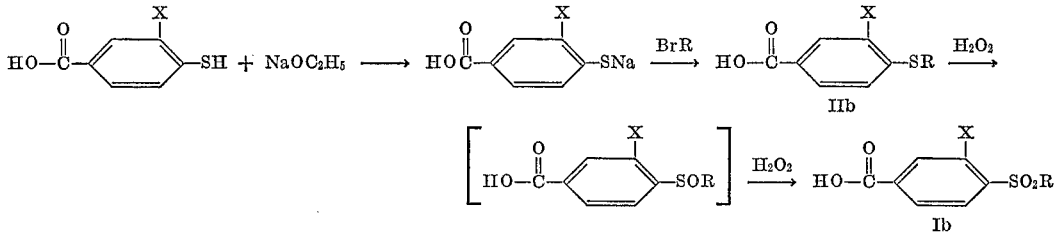

TABLE I

| Example | X | —R | Intermediate IIb M.P., °C. | Formula | Analysis C | H | Final product Ib M.P., °C. | Formula | Analysis C | H |
|---|---|---|---|---|---|---|---|---|---|---|
| 12 | H | —CH(C₂H₅)₂ | 100–101 | C₁₂H₁₆O₂S Calcd. Found | 64.25 64.38 | 7.19 7.21 | 218–220 | C₁₂H₁₆O₄S Calcd. Found | 56.23 56.39 | 6.29 6.24 |
| 13 | H | —CH₂CH=C(CH₃)₂ | 138–140 | C₁₂H₁₄O₂S Calcd. Found | 64.83 65.05 | 6.35 6.30 | 207–209 | C₁₂H₁₄O₄S Calcd. Found | 56.68 56.96 | 5.55 5.62 |
| 14 | H | —⟨S⟩ | 161–163 | C₁₃H₁₆O₂S Calcd. Found | 66.07 66.53 | 6.83 6.99 | 227–229 | C₁₃H₁₆O₄S Calcd. Found | 58.19 58.61 | 6.01 6.13 |
| 16 | H | —(CH₂)₃CH(CH₃)₂ | 108–110 | C₁₃H₁₈O₂S Calcd. Found | 65.51 65.39 | 7.61 7.33 | 179–181 | C₁₃H₁₈O₄S Calcd. Found | 57.76 57.39 | 6.71 6.66 |
| 17 | H | —(CH₂)₆CH₃ | 110–112 | C₁₄H₂₀O₂S Calcd. Found | 66.63 66.39 | 7.99 7.98 | 172–174 | C₁₄H₂₀O₄S Calcd. Found | 59.14 59.69 | 7.09 6.89 |
| 18 | H | —CH₂—⟨S⟩ | 168–170 | C₁₄H₁₈O₂S Calcd. Found | 67.17 67.05 | 7.25 7.24 | 219–221 | C₁₄H₁₈O₄S Calcd. Found | 59.55 59.93 | 6.43 6.37 |
| 19 | H | —CH(C₂H₅)(n-C₄H₉) | 50 | C₁₄H₂₀O₂S Calcd. Found | 66.63 66.44 | 7.98 7.98 | 149–150 | C₁₄H₂₀O₄S Calcd. Found | 59.14 59.21 | 7.09 7.17 |
| 20 | H | —⟨bicyclic⟩ | 194–196 | C₁₄H₁₆O₂S Calcd. Found | 67.71 67.74 | 6.50 6.58 | 217–219 | C₁₄H₁₆O₄S Calcd. Found | 59.98 60.02 | 5.75 5.79 |
| 21 | H | —CH(CH₃)⟨S⟩ | 157–159 | C₁₅H₂₀O₂S Calcd. Found | 68.14 68.17 | 7.63 7.51 | 200–202 | C₁₅H₂₀O₄S Calcd. Found | 60.79 60.56 | 6.80 6.62 |

| | | | Intermediate IIb | | | Final product Ib | | |
|---|---|---|---|---|---|---|---|---|
| | | | | Analysis | | | Analysis | |
| Example | X | —R | M.P., °C. | Formula | C H | M.P., °C. | Formula | C H |
| 22 | H | (3-ethylthiophene) | 151–153 | $C_{15}H_{20}O_2S$ Calcd. Found | 68.14 7.63 68.05 7.42 | 200–202 | $C_{15}H_{20}O_4S$ Calcd. Found | 60.79 6.80 60.91 6.81 |
| 23 | H | —CH₂CH₂—(thiophene) | 140–141 | $C_{15}H_{20}O_2S$ Calcd. Found | 68.14 7.63 68.32 7.65 | 197–198 | $C_{15}H_{20}O_4S$ Calcd. Found | 60.79 6.80 60.35 6.84 |
| 24 | H | —(CH₂)₂CH(CH₃)(CH₂)₃CH(CH₃)₂ | 85–87 | $C_{17}H_{24}O_2S$ Calcd. Found | 69.34 8.90 69.52 8.75 | 192–194 | $C_{17}H_{24}O_4S$ Calcd. Found | 62.64 8.03 62.74 7.80 |
| 25 | H | —(CH₂)₄CH₃ | 110–112 | $C_{12}H_{16}O_2S$ Calcd. Found | 64.25 7.19 64.03 6.87 | 173–175 | $C_{12}H_{16}O_4S$ Calcd. Found | 56.23 6.29 56.51 6.13 |
| 26 | —F | (thiophene) | | No data | | | No data | |
| 27 | —CF₃ | —CH₂CH₂C≡CH | | No data | | | No data | |
| 28 | —Cl | (furan) | | No data | | | No data | |
| 29 | —CH₃ | —CH₂CH₂CH₂CH₂Cl | | No data | | | No data | |
| 30 | —CH₃ | —CH₂CH₂CH₂CH(Cl)₂ | | No data | | | No data | |
| 31 | H | (pyridine) | | No data | | | No data | |
| 32 | —CF₃ | —CH₂CH₂CH₂C(Cl)₃ | | No data | | | No data | |
| 33 | —CF₃ | —CH(n—C₃H₇)₂ | | No data | | | No data | |
| 34 | —Cl | (thiazole) | | No data | | | No data | |
| 35 | —Cl | (thiazine) | | No data | | | No data | |

The novel compounds of this invention are uricosuric agents which can be administered in a wide variety of dosages in conventional vehicles as, for example, by oral administration in the form of a tablet or by intravenous injection. Also, the daily dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products which may be administered in a totally daily dosage of from 100 mg. to 2,000 mg. in a phamaceutically acceptable carrier.

A suitable unit dosage form of the products of this invention can be administered by mixing 50 milligrams of 3-chloro-4-(4-heptylsulfonyl)benzoic acid (I) or a suitable salt with 149 mg. of lactose and 1 mg. of magnesium stearate and placing the 200 mg. mixture into a No. 2 gelatin capsule. Similarly, by employing more of the active ingredient and less lactose, other dosage forms can be put up in No. 2 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention in a unit dosage form or to combine one or more of the compounds of this invention with other known uricosurics or with other desired therapeutic and/or nutritive agents in dosage unit form.

The following example is included to illustrate the preparation of a representative dosage form:

EXAMPLE 36

Dri-filled capsules containing 50 mg. of active ingredient per capsule

| | mg. per capsule |
|---|---|
| 3-chloro-4-(4-heptylsulfonyl)-benzoic acid | 50 |
| Lactose | 149 |
| Magnesium stearate | 1 |
| Capsule (size No. 2) | 200 |

The 3-chloro-4-(4-heptylsulfonyl)benzoic acid is reduced to a No. 60 powder and then lactose and magnesium stearate are passed through a No. 60 bolting cloth onto the powder and the combined ingredients admixed for 10 minutes and then filled into a No. 2 dry gelatin capsule.

Similar dry-filled capsules can be prepared by replacing the active ingredient of the above example by any of the other novel compounds of this invention.

It will be apparent from the foregoing description that the sulfonylbenzoic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

We claim:

1. A compound selected from:

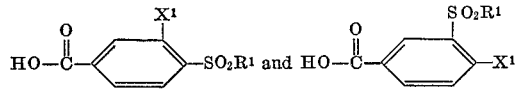

wherein $R^1$ is primary or secondary alkyl containing from 6 to 7 carbon atoms and $X^1$ is hydrogen, halo, or trihalomethyl and the non-toxic, pharmaceutically acceptable salts, the lower alkyl, benzamido lower alkyl and lower alkanamido lower alkyl esters thereof.

2. A compound according to claim 1 wherein $X^1$ is halo and $R^1$ is straight or branched chain alkyl.

3. A compound according to claim 1 wherein $X^1$ is hydrogen and $R^1$ is straight or branched chain alkyl.

4. A compound according to claim 1 wherein $X^1$ is trihalomethyl and $R^1$ is straight or branched chain alkyl.

5. A compound according to claim 2 wherein $X^1$ is chloro and $R^1$ is 4-heptyl.

6. A compound according to claim 3 wherein $R^1$ is 4-heptyl or 1-heptyl.

7. A compound according to claim 4 wherein $R^1$ is 4-heptyl and $X^1$ is trifluoromethyl.

References Cited

UNITED STATES PATENTS 3,332,982   7/1967   Schmidt et al. _____ 260—470

OTHER REFERENCES

"Ciba," Chem. Abstracts, Vol. 59 (1963), p. 9912d.

JAMES A. PATTEN, Primary Examiner

U.S. Cl. X.R.

260—192, 293.73, 294.8 C, 326.82, 347.2, 470, 471 R, 472, 501.21, 515 M, 516, 556 AR, 556 B, 556 C, 558 S; 424—263, 267, 274 285, 308, 310, 324